United States Patent [19]
Anshel et al.

[11] Patent Number: 5,440,640
[45] Date of Patent: Aug. 8, 1995

[54] MULTISTREAM ENCRYPTION SYSTEM FOR SECURE COMMUNICATION

[75] Inventors: Michael M. Anshel; Izidor C. Gertner, both of New York, N.Y.; Dorian Goldfeld, Tenafly; Boris A. Klebansky, Demarest, both of N.J.

[73] Assignee: Arithmetica, Inc., Wilmington, Del.

[21] Appl. No.: 131,542

[22] Filed: Oct. 5, 1993

[51] Int. Cl.⁶ .............................................. H04L 9/22
[52] U.S. Cl. ......................................... 380/46; 380/47
[58] Field of Search ..................... 380/46, 47, 49, 50; 364/717

[56] References Cited

U.S. PATENT DOCUMENTS

| | | | |
|---|---|---|---|
| 4,202,051 | 5/1980 | Davida et al. | 364/717 |
| 4,747,139 | 5/1988 | Taaffe | 380/46 |
| 4,799,259 | 1/1989 | Ogrodski | 380/46 |
| 5,008,935 | 4/1991 | Roberts | 380/29 |
| 5,048,086 | 9/1991 | Bianco et al. | 380/46 |
| 5,159,633 | 10/1992 | Nakamura | 380/30 |
| 5,163,092 | 11/1992 | McNesby et al. | 380/50 |
| 5,177,790 | 1/1993 | Hazard | 380/28 |
| 5,241,602 | 8/1993 | Lee et al. | 380/50 |
| 5,257,282 | 10/1993 | Adkisson et al. | 380/46 |
| 5,267,316 | 11/1993 | Merino Gonzalez et al. | 380/46 |
| 5,327,365 | 7/1994 | Fujisaki et al. | 364/717 |

OTHER PUBLICATIONS

R. Lidl and H. Niedereiter, *Introduction to Finite Fields and Their Applications;* Cambridge University Press; New York, N.Y. (1986), pp. 271–272, 281–282.

H. Beker and F. Piper, *Cipher Systems;* John Wiley & Sons, N.Y. (1982) pp. 159–174.

L. Blum, M. Blum and M. Shub, *A Simple Unpredictable Pseudo-Random Number Generator;* Siam J. Comput., vol. 15, No. 2, May 1986, pp. 364–383.

D. Kahn, *The Codebreakers, The Story of Secret Writing;* Macmillan Publishing Co., New York (1967); pp. 394–403.

Primary Examiner—Salvatore Cangialosi
Attorney, Agent, or Firm—Fulbright & Jaworski

[57] ABSTRACT

MUSE, a programmable multistream encryption system for secure communication provides dynamic cryptographic security and a highly efficient surveillance mechanism for transferring very large blocks of data (VLBD) subject to real-time constraints. Encryption varies pseudorandomly in both space and time. MUSE allows the user to specify a finite state machine which sequentially accepts parallel streams of data (VLBD) and encrypts this data in real time employing an arithmetic-algebraic pseudorandom array generator (PRAG). The method of enciphering is a one-time algebraic pad system which views the incoming data streams as elements from an algebraic alphabet (finite ring) and encrypts by adding to this a pseudorandom vector sequence iteratively generated from a single seed key. Decipherment is obtained by reversing this process.

13 Claims, 4 Drawing Sheets

MULTISTREAM ENCRYPTION SYSTEM FOR SECURE COMMUNICATION

BACKROUND OF THE INVENTION

1. Field of the Invention

The invention relates to an encryption system for secure communications and more particularly to a multistream encryption system called MUSE.

2. Description of the Related Technology

The need for a programmable high speed encryption system processing parallel streams of very large blocks of data (VLBD) emerges from several new computing and communication technologies. Such technologies include distributed multimedia information systems supported by high performance computer networks employing digital fiber optics for transmission. Contemporary products of these technologies include e-mail, fax, voicemail, cellular telephony, video conferencing, image archiving, and satellite communication. Because of the rapid development of these technologies, contemporary cryptographic methods have not concurrently addressed this need in its totality.

SUMMARY OF THE INVENTION

A multistream of data enters MUSE at discrete time instances $t_i$ and is dynamically allocated to a large set of buffers $B_1, B_2, \ldots, B_m$. The arithmetic of each buffer $B_j$ is based on an individual ring structure $R_j$. From a single seed key, not stored in memory, PRAG, an arithmetic-algebraic pseudorandom array generator, using arithmetic in another direct product of rings, generates a pseudorandom vector key stream $\kappa(t_i)$ parametrized by time. At each time instance $t_i$, PRAG generates from $\kappa(t_i)$, a pseudorandom vector of pseudorandom number sequences where each vector component is taken in the ring $R_j$ and added to the buffer $B_j$. The encrypted data is shipped and the buffers are refilled with incoming data. Decryption is performed by reversing the process and requires knowledge of the seed key.

MUSE provides space-time encipherment. Encryption is different at each buffer (space) and at each time instance. Moreover, the encryption dynamics is itself pseudorandom as space and time vary. This provides an added dimension of security. A novel feature of MUSE is a surveillance mechanism which instantaneously detects unauthorized attempts at decryption and reports such occurrences to authorized users.

According to an advantageous feature of the invention, incoming data streams may be of a very large or even unlimited size. Encryption of an endless data stream can be accomplished by a system including a real time array generator. The pseudorandom array generator operates to generate relatively small encryption arrays when compared to the potential size of the incoming data stream. According to a preferred embodiment, the encryption array may be 1K bits by 1K bits. The pseudorandom array generator iteratively generates a sequence of arrays. Each successive array may be based on the next-state output of the key vector generator.

BRIEF DESCRIPTION OF THE DRAWINGS

The invention will now be described in greater detail by way of example with reference to the drawings.

DETAILED DESCRIPTION OF THE PREFERRED EMBODIMENT

1. Conceptual Architecture

Figure 1:
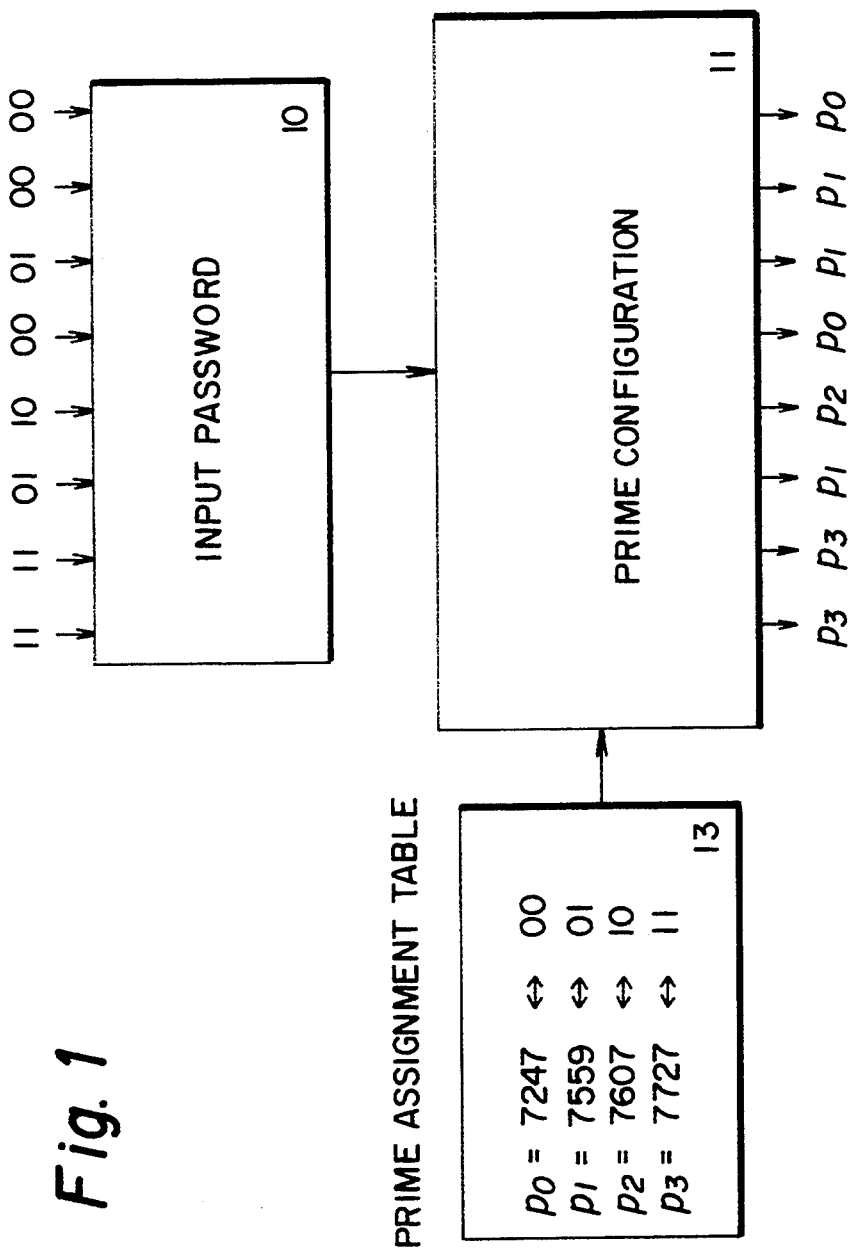
FIG. 1 is a block diagram of the Prime Configuration Machine.

The origins of contemporary stream ciphers stems from the one-time pad cryptosystem or Vernam Cipher, named in honor of G. Vernam who developed the method in 1917 for purposes of telegraphic communication (D. Kahn, *The Code Breakers, The Story of Secret Writing*, Macmillan Publishing Co., New York (1967)). The one-time pad cryptosystem is one of the simplest and most secure of private-key cryptosystems. It operates in the following manner.

Let $\mathbb{F}_2$ denote the finite field of two elements 0, 1 which we call bits (R. Lidl and H. Niederreiter, *Introduction to Finite Fields and their Applications*, Cambridge Univ. Press, New York (1986), [L-N]). A plaintext message is given by a string of bits $$m = m_1 m_2 \ldots m_s.$$

The sender A(lice) and the receiver B(ob) agree on a long random string of bits $$k = k_1 k_2 \ldots k_t,$$

where $s \geq t$, the private key, which is to be used only once and then destroyed. The sender A forms the ciphertext string $$c = c_1 c_2 \ldots c_s,$$

where $c_i = m_i + k_i$, ($i = 1, \ldots, s$) and addition of bits is in $\mathbb{F}_2$. The ciphertext c is then transmitted to B who decrypts c by forming $c_i + k_i \in \mathbb{F}_2$, thereby, obtaining $m_i$. This is a perfect, unbreakable cipher when all different keys and messages are equally likely. Since the key size is at least as large as the data size, the cost of implementation of this method is very high.

In order to specify MUSE, we need some concepts from systems theory (see [L-N]). A complete, deterministic, finite state system $\mathcal{M}$ is defined by the following:

M1: A finite nonempty set $U = \{\alpha_1, \alpha_2, \ldots, \alpha_h\}$, called the input alphabet of $\mathcal{M}$.

M2: A finite nonempty set $Y = \{\beta_1, \beta_2, \ldots, \beta_s\}$ called the output alphabet of $\mathcal{M}$. An element of Y is called an output symbol.

M3: A finite nonempty set $S = \{\sigma_1, \sigma_2, \ldots \sigma_r\}$ called the state set of $\mathcal{M}$. An element of S is called a state.

M4: A next state function $f: S \times U \to Y$ that maps the set of ordered pairs $(\sigma_i, \sigma_j)$ into S.

M5: An output function $g: S \times U \to Y$ that maps the set of all ordered pairs $(\sigma_i, \alpha_i)$ into Y.

A finite-state system $\mathcal{M}$ can be interpreted as a device whose input, output and state at time t are denoted by u(t), y(t), and s(t) where the variables are defined for integers t only and assume values taken from U, Y, S, respectively. Given the state and input of M at time t, f specifies the state at time $t+1$ and g, the output at time t.

M6: $s(t+1) = f(s(t),u(t))$.

M7: $y(t) = g(s(t),u(t))$.

A finite state system is called autonomous in the case that the next state function depends only on the previous state and not on the input. In this case M8: $s(t+1) = f(s(t))$ (autonomous transition).

By a synchronous stream cipher is meant an autonomous finite-state system $\mathcal{M}_C$ (here C denotes cipher) where the plaintext and ciphertext alphabets are the input and output alphabets, respectively. The states S of $\mathcal{C}$ are referred to as keys, the start-state $s(0)$ is called the seed key, the progression of states $s(0), s(1), \ldots,$ is called the key stream, the next state function $f$ is called the running key generator, and the output function $g(t)$ is the enciphering function. Moreover, the finite-state system $\mathcal{M}_c$ satisfies the following conditions:

M9: The number of possible keys must be large enough so that exhaustive search for the seed key $s(0)$ is not feasible.

M10: The infinite key stream $s(0), s(1), \ldots,$ must have guaranteed minimum length for their periods which exceed the length of the plaintext strings.

M11: The cipherment must appear to be random.

2. Pseudorandom Array Generator

We assume the standard characterization of pseudorandom binary sequences (H. Beker & F. Piper, *Cipher Systems*, John Wiley and Sons, New York (1982)). This notion may be generalized to higher dimensions. Consider a vector $$\bar{v} = (v_1, \ldots, v_n)$$

of dimension n whose components v are binary sequences. We say $\bar{V}$ is pseudorandom if each component $v_i$ is pseudorandom and the concatenation $v_1 v_2 \ldots v_n$ of binary strings is itself pseudorandom. A two dimensional array of binary strings is pseudorandom if each row and column (considered as vectors) is pseudorandom. Finally, consider a set of arrays of fixed dimension $m \times n$ which are parametrized by a discrete time scale t. Denote the array at time t by $$A(t) = (\alpha_{ij}(t))_{1 \leq i \leq m, 1 \leq j \leq n}.$$

We define the parametrized array to be pseudorandom if each array $A(t)$ is pseudorandom and for all fixed $i,j$ with $1 \leq i \leq m$ and $1 \leq j \leq n$ the sequence $\alpha_{ij}(t)$ is pseudorandom as t varies.

We now describe a complete deterministic autonomous finite state system with the property that it generates time-parametrized pseudorandom arrays. Such a machine will be called a pseudorandom array generator. It will depend on three programmable parameters, a positive integer m, a positive integer l which divides m and an m-tuple $(b_1, \ldots, b_m)$ of positive integers $b_i$. To complete the description of the pseudorandom array generator, it only remains to specify the set of states S, the set of outputs Y, the next state function $f$ which satisfies M8, i.e., $$s(t+1) = f(s(t)),$$

and the output function g. We assume the state set S consists of a nonempty finite set of l-tuples whose components are binary strings. Every $s \in S$ will be of the form $s = (s_1, \ldots, s_l)$ where $s_i$ are binary (or bit) strings of zeros and ones. The output set Y will be a finite set of $$l \times \frac{m}{l}$$

arrays where the $ij^{th}$ component of the array is a binary string of length $b_e$ where $$e = i\frac{m}{l} + j.$$

We require that the output function $g: S \times U \rightarrow Y$ for our pseudorandom array generator does not depend on U, so that it is a function from $S \rightarrow Y$, i.e., generator. The only other requirements for the next state function $f$ and the output function g are that $g(s(t))$ with $s(t) \in S$ is a pseudorandom time parametrized array and that f and g can be computed in real time.

We now describe a special pseudorandom array generator that is based on the algebraic structure of a direct product of finite rings. This particular pseudorandom array generator will henceforth be called PRAG and will constitute the main component of the machine MUSE described in the next section.

Fix three programmable parameters for PRAG; a positive integer m, a positive integer l which divides m, and an m-tuple $(b_1, \ldots, b_m)$ of positive integers $b_i$. Set $$\mathcal{R}' = \prod_{i=1}^{l} R'_i$$

to be the direct product of l finite rings, $R'_1, \ldots, R'_l$. The set of states $S_{PRAG}$ for PRAG consists of all l-tuples whose $i^{th}$ component is a binary coded element of $R'_i$. Then PRAG will have l state buffers $$B_1^{state}, \ldots, B_l^{state}$$

where the bit size of $B_i^{state}$ is $\lceil \log_2 |R'_i| \rceil$, i.e., the bit size of the largest element of $R'_i$. Here $\lceil x \rceil$ (ceiling function) is the smallest integer greater or equal to x and $|A|$ denotes the cardinality of any set A. At time $t=0$, the seed key $s(0) = (s(0)_1, \ldots, s(0)_l)$ enters the state buffers (i.e. $s(0)_i \in s^{state}$). At time $t \geq 0$, the state buffers are erased and replaced with $s(t+1) = f_{PRAG}(s(t))$, where $f_{PRAG}$ is the next state function for PRAG. The output alphabet $Y_{PRAG}$ will consist of all possible arrays with l rows and $m/l$ columns whose $ij^{th}$ component is a binary string of length $b_e$ with $$e = i\frac{m}{l} + j.$$

At each time t, the state $s(t) \in S_{PRAG}$ is mapped to $Y_{PRAG}$ by the output function $g_{PRAG}$.

The algorithm for PRAG may be further generalized by allowing the output set $\mathcal{R}$ to vary pseudorandomly according to a selection function which selects l finite rings from a larger fixed collection of finite rings.

3. Mathematical Description of MUSE

Fix a positive integer m and a vector $\bar{b} = (b_1, b_2, \ldots, b_m)$ of positive integers. We assume we have m data buffers $$B_1^{data}, \ldots, B_m^{data}$$

of sizes $b_1, \ldots, b_m$. A multistream of data enters and fills each data buffer $B_i^{data}$ with a $b_i$-tuple of elements in a finite ring $R_i$. The bit size of this $b_i$-tuple is in general larger than $b_i$. This, however, poses no problem in our subsequent discussion. Let $$\mathcal{R} = \prod_{i=1}^{m} R_i$$

be the direct product of the m finite rings $R_i$. The choice of m, $\bar{b}$, and $\mathcal{R}$ determines the algebraic structure in which MUSE operates and MUSE provides the user with an algorithm to specify these three data types.

Having chosen m, $1|m$, $\bar{b}$, $\mathcal{R}$, choose another direct product of rings $$\mathcal{R}' = \prod_{i=1}^{l} R_i',$$

which together with m, $1|m$, $\bar{b}$ determine PRAG as in section 2. We may now define MUSE as an autonomous finite state system satisfying M1–M11. We proceed to specify the input alphabet $U_{MUSE}$, the output alphabet $Y_{MUSE}$, the set of states $S_{MUSE}$, the next state function $f_{MUSE}$, and the output function $g_{MUSE}$ for MUSE.

First, $$U_{MUSE} = Y_{MUSE} = Y_{PRAG} = \prod_{i=1}^{m} R_i^{b_i}.$$

This agrees with our earlier description of $Y_{PRAG}$ after noting the isomorphism $$(b_1, \ldots, b_m) \to \begin{pmatrix} b_1 & b_{l+1} & \cdots & b_{\left(\frac{m}{l}-1\right)l+1} \\ \cdot & \cdot & & \cdot \\ \cdot & \cdot & & \cdot \\ \cdot & \cdot & & \cdot \\ b_l & b_{2l} & \cdots & b_{\frac{m}{l}l} \end{pmatrix},$$

i.e., this corresponds to laying out the buffers in an array of l rows and m/l columns.

Second, the set of states for MUSE is the same as the set of states for PRAG, $$S_{MUSE} = S_{PRAG}.$$

Similarly, the next state function $$f_{MUSE} = f_{PRAG},$$

but the output functions $$g_{MUSE} \neq g_{PRAG},$$

are different.

MUSE will have two possible output modes: the encryption output function, denoted $g_{MUSE}^{encrypt}$ and the decryption output function, denoted $g_{MUSE}^{decrypt}$. Let $u(t) \in U_{MUSE}$ be a multistream input of data which arrives at time t, which we envision as instantaneously filling m buffers of lengths $b_1, \ldots, b_m$. We define the output functions for MUSE by the rules $$g_{MUSE}^{encrypt}(s(t),u(t)) = u(t) + g_{PRAG}(s(t))$$

$$g_{MUSE}^{decrypt}(s(t),u(t)) = u(t) - g_{PRAG}(s(t))$$

where addition (subtraction) is performed componentwise in the direct product of rings $\mathcal{R}$. The block diagram

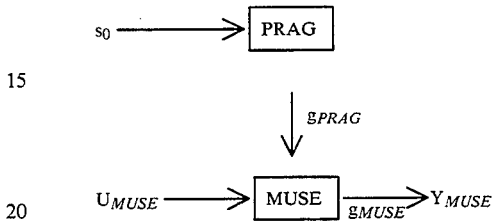

completes our construction.

We conclude the mathematical description of MUSE by noting that a surveillance mechanism derives from the following observations:

If decryption is performed with an illegal seed key $s'(0) \neq s(0)$ (where $s(0)$ is the legitimate seed key), then the output will be a pseudorandom time parametrized array which may be quickly detected via simple statistical tests of counting zeros and ones and blocks of zeros (gaps) and blocks of ones (runs). Moreover, the overall space-time complexity of the surveillance mechanism is negligible and its benefit to the user, substantial.

4. Example [1]

We employ the notation of section 3. Let m be a fixed small positive integer and let $\bar{b} = (b_1, b_2, \ldots, b_m)$ again denote a fixed vector of positive integers. Let $$\mathcal{R} = \mathbf{F}_2^m,$$

be the direct product of m copies of $\mathbf{F}_2$. Choose $l=1$ which satisfies the condition that l divides m.

Following the notation of [L−N], denote (for a positive integer N) the finite ring of integers (mod N) by $\mathbb{Z}/(N)$. We shall say a prime number p is successive if $p−3$ is divisible by 4, $(p−1)/2$ is also a prime, and $$\left(\frac{p-1}{2} - 1\right)/2$$

is again a prime. Define the function $$\psi(x) = +1 \text{ if } \left(\frac{x-1}{2} - 1\right)/8$$

is an integer and $$\psi(x) = -1 \text{ if } \left(\frac{x-1}{2} + 1\right)/8$$

is an integer. Choose two large successive primes p, q satisfying $\psi(p) \neq \psi(q)$, and define the ring $\mathcal{R}' = \mathbb{Z}/(N)$ with $N = pq$.

With these choices for m, l, and $\mathcal{R}'$ we shall now describe a pseudorandom array generator PRAG. The peculiar choice of N insures a very long cycle length (see L. Blum, M. Blum, and M. Shub, Siam J. Comput. Vol 15, No. 2 (1986), 364-383) in PRAG.

The state set $S_{PRAG}$ is the set $\mathcal{R}' = \mathbb{Z}/(N)$. The next state function $f_{PRAG}$ is defined by the rule:

$$f_{PRAG}(s(t)) = s(t)^2 + 1 = s(t+1) \pmod{N}.$$

Now we specify the output function $g_{PRAG}$. Code the elements of $\mathbb{Z}/(N)$ as binary coded integers of fixed length exceeding m. It is required that $m < \log_2(N)$. For $\chi \in \mathbb{Z}/(N)$ define $\text{Proj}_m(\chi)$ to be the last m bits of $\chi$ in this coding. We now describe an algorithm to compute $g_{PRAG}(s(t))$. All arithmetic is performed in the ring $\mathbb{Z}/(N)$.

Step 1. Compute $b = \max\{b_1, \ldots, b_m\}$.
Step 2. Compute the b-element vector $\vec{s}(t) = (s(t)^2, s(t)^4, \ldots, s(t)^{2b})$.
Step 3. Apply $\text{Proj}_m$ to each component of $\vec{s}(t)$ obtaining $$(\text{Proj}_m(s(t)^2), \ldots, \text{Proj}_m(s(t)^{2m}))$$

Step 4. Create the dynamic array $D_1(t)$ of b rows and m columns where the $j^{th}$ row is the vector $\text{Proj}_m(s(t)^{2j})$.
Step 5. Shape a new array $D_2(t)$ which has b rows but whose column lengths vary. For $1 \leq j \leq m$, the $j^{th}$ column of $D_2(t)$ will consist of $b_j$ elements, namely, the first $b_j$ elements of the $j^{th}$ column of $D_1(t)$.

This describes the output function $g_{PRAG}$ at time t. In this example $$g_{MUSE}^{encrypt} = g_{MUSE}^{decrypt},$$

because addition and subtraction are the same in 2, the finite field of two elements.

5. Example [2]

As a second example of MUSE, we describe an extremely rapid encryption system which can be implemented in software. From the user's point of view, the system runs as follows. The user chooses a password which internally leads to a certain configuration of finite fields. The password is not in memory! Every time the user opens MUSE he must type in his password. If the user wants to encrypt a specific file he can either use his password (default choice) or choose a special key for that file. At this point MUSE encrypts the file and erases the key, password, and original file. All that remains is an encrypted copy of the file. To decrypt the file, the user opens MUSE, chooses the file, types in the same password and key, and MUSE decrypts the file. If the wrong password or key is chosen, the file will not decrypt.

We now describe the principle of operation for this example of MUSE using concrete numbers. First, we choose 4 successive primes $p_0, p_1, p_2, p_3$ of the same approximate bit length (see example [1] for the definition of successive prime). For example, we may choose:

$$p_0 = 7247, p_1 = 7559, p_2 = 7607, p_3 = 7727.$$

We assign $p_k$ with the binary expansion of k, i.e. $p_0$ is assigned to 00, $p_1$ is assigned to 01, $p_2$ is assigned to 10, and $p_3$ is assigned to 11.

TABLE 1

Prime Assignment Table $p_0 = 7247 \longleftrightarrow 00$ $p_1 = 7559 \longleftrightarrow 01$ $p_2 = 7607 \longleftrightarrow 10$ $p_3 = 7727 \longleftrightarrow 11$ We now describe a Prime Configuration Machine which converts a password = 16-bit number into a list of 8 primes $\{P^1, P^2, P^3, P^4, P^5, P^6, P^7, P^8\}$ where each $P^i$ (for $1 < i < 8$) is one of the four primes 7247, 7559, 7607, 7727. The 16-bit password is simply broken up into 8 two-bit pieces and the Prime Assignment Table is then used to configure the primes. For example, if the password is 11 11 01 10 00 01 00 00, (the first 16 significant bits in the binary expansion of $\sqrt[3]{2}$) then the prime configuration would be $$\{p^3, p^3, p^1, p^2, p^0, p^1, p^1, p^0\}.$$

The block diagram for the Prime Configuration Machine is shown in FIG. 1.

The system may include an input password 10. The illustrated embodiment shows a 16-bit input password. The password or a user selected special key should not be retained in memory or stored after the encryption process is complete. The password itself may not be suitable for use as a seed key for pseudorandom array generation. The prime configuration block 11 maps the password into a series of primes for use in generating a series of keys. The mapping may be done by any variety of means. According to the preferred embodiment, a prime assignment table 12, in the form of a look-up table, is utilized. Alternatively, the mapping may be accomplished by hardware logic gating or by calculating successive primes based on a default, user input or a pseudorandom input.

Figure 2:
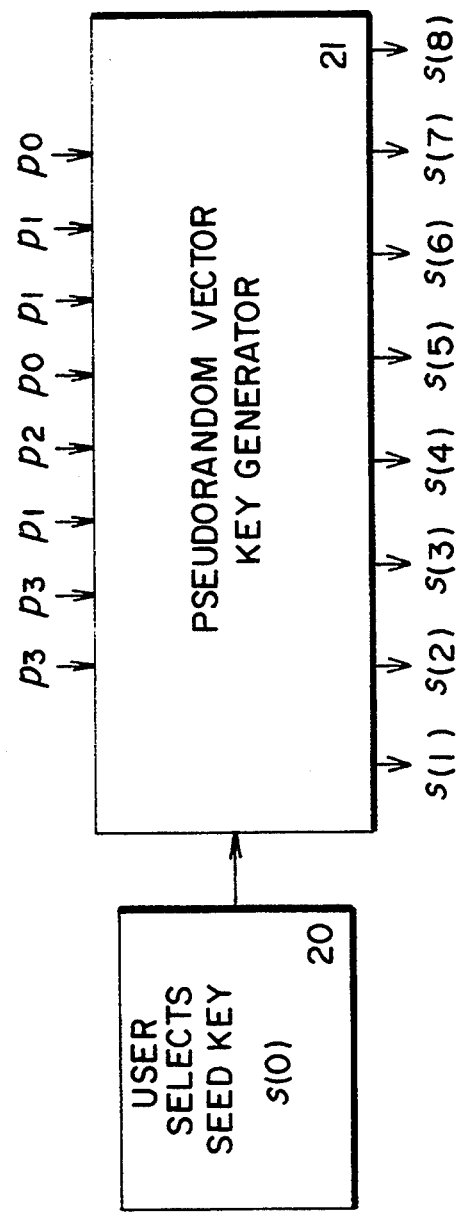
FIG. 2 is a block diagram of the Pseudorandom Vector Key Generator.

Next we describe a Pseudorandom Vector Key Generator, shown in FIG. 2, which from a single seed key s(0) (13-bit number) 20, generates a vector or list of 8 keys:

$$\{s(1), s(2), s(3), s(4), s(5), s(6), s(7), s(8)\}.$$

The seed key s(0) is either the first 13 bits of the password (default choice) or another user optional 13-bit number. The recipe for generating the keys s(k) (for $k = 1, 2, 3, \ldots 8$) is given by the next state function:

$$s(k) = s(k-1)^2 + 1 \pmod{P_k},$$

For example, if we use the first 13 bits of the password, we have:

$$s(0) = 11\ 11\ 01\ 10\ 00\ 01\ 0 = 7874.$$

The Pseudorandom Vector Key Generator 21, computes the eight keys as follows:

$s(1) = s(0)^2 + 1 \pmod{p_3} = 7874^2 + 1 \pmod{7727} = 6156$ $s(2) = 6156^2 + 1 \pmod{7727} = 3129$ $s(3) = 3129^2 + 1 \pmod{7559} = 1737$ $s(4) = 1737^2 + 1 \pmod{7607} = 4798$ $s(5) = 4798^2 + 1 \pmod{7247} = 4333$ $s(6) = 4333^2 + 1 \pmod{7559} = 5893$ $s(7) = 5893^2 + 1 \pmod{7559} = 1404$ $s(8) = 1404^2 + 1 \pmod{7247} = 33.$ We have thus obtained the key vector

{6156, 3129, 1737, 4789, 4333, 5893, 1404, 33}.

This process can be repeated by setting the new $s(0) = s(8)$. The Pseudorandom Vector Key Generator is advantageously implemented in software. Alternatively, in order to maximize speed, the Generator may be hardware implemented.

Figure 3:
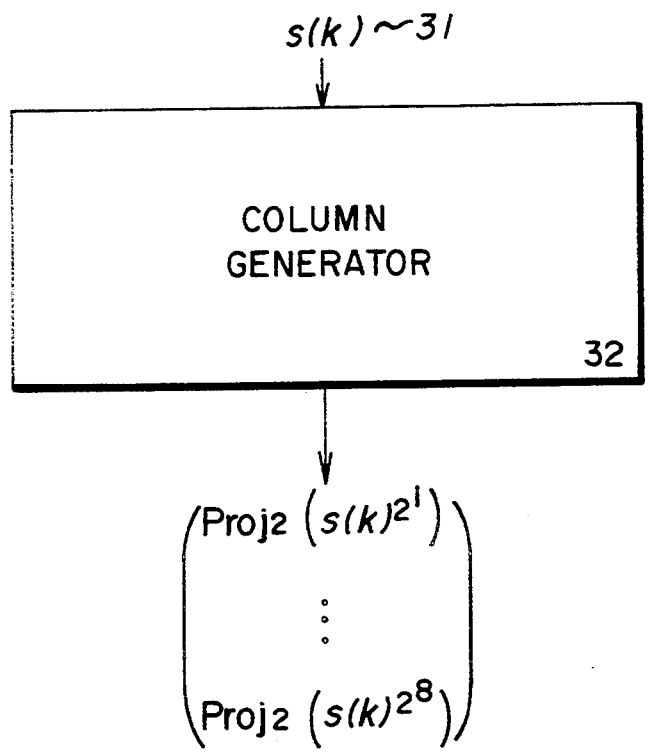
FIG. 3 is a block diagram of the Pseudorandom Column Generator.

Next, we describe a Pseudorandom Column Generator, shown in FIG. 3, which for each seed key $s(k)$ (with $1 \leq k \leq 8$) 31, generates a column vector of 8 two-bit binary numbers. The Column Generator 32 uses a projection operator which we now define. The projection operator $Proj_m(x)$ picks off the last m digits in the binary expansion of x. Examples:

$Proj_1(11010010110) = 0$ $Proj_2(11010010110) = 10$ $Proj_3(11010010110) = 110$ $Proj_4(11010010110) = 0110$ $Proj_5(11010010110) = 10110$ $Proj_6(11010010110) = 010110.$ The Column Generator can be succinctly described as a two step process:

Step (1) Compute $(s(k)^{2^1}, s(k)^{2^2}, s(k)^{2^3}, \ldots, s(k)^{2^8}) \pmod{P^k}$.

Step (2) Apply $Proj_2$ to each element in the above list to obtain the column vector $$\begin{pmatrix} Proj_2(s(k)^{2^1}) \\ Proj_2(s(k)^{2^2}) \\ Proj_2(s(k)^{2^3}) \\ Proj_2(s(k)^{2^4}) \\ Proj_2(s(k)^{2^5}) \\ Proj_2(s(k)^{2^6}) \\ Proj_2(s(k)^{2^7}) \\ Proj_2(s(k)^{2^8}) \end{pmatrix}.$$

In our example, we have:

$s(1) = 6156$ $s(1)^2 = 3128 = 110000111000$ $s(1)^4 = 2002 = 11111010010$ $s(1)^8 = 5418 = 1010100101010$ $s(1)^{16} = 7578 = 1110110011010$ $s(1)^{32} = 6747 = 1101001011011$ $s(1)^{64} = 2252 = 10001100100$ $s(1)^{128} = 2592 = 101000100000$ $s(1)^{256} = 3701 = 111001110101.$

After applying $Proj_2$ we obtain the column vector:

$$\begin{pmatrix} 0 & 0 \\ 1 & 0 \\ 1 & 0 \\ 1 & 0 \\ 1 & 1 \\ 0 & 0 \\ 0 & 0 \\ 0 & 1 \end{pmatrix}.$$

Repeating this calculation for $s(2) = 3129$ we obtain $(s(2)^{2^1}, s(2)^{2^2}, s(2)^{2^3}, \ldots, s(2)^{2^8}) \pmod{7727} =$ $= (532, 4852, 5462, 7224, 5745, 3008, 7474, 2193),$ which, after applying $Proj_2$ yields $$\begin{pmatrix} 0 & 0 \\ 0 & 0 \\ 1 & 0 \\ 0 & 0 \\ 0 & 1 \\ 0 & 0 \\ 1 & 0 \\ 0 & 1 \end{pmatrix}.$$

Repeating this calculation for $s(3) = 1737$ we obtain $(s(3)^{2^1}, s(3)^{2^2}, s(3)^{2^3}, \ldots, s(3)^{2^8}) \pmod{7559} =$ $= (1128, 2472, 3112, 1465, 7028, 2278, 3810, 2820),$ which, after applying $Proj_2$ yields $$\begin{pmatrix} 0 & 0 \\ 0 & 0 \\ 0 & 0 \\ 0 & 1 \\ 0 & 0 \\ 1 & 0 \\ 1 & 0 \\ 0 & 0 \end{pmatrix}.$$

Repeating this calculation for $s(4) = 4798$ we obtain $(s(4)^{2^1}, s(4)^{2^2}, s(4)^{2^3}, \ldots, s(4)^{2^8}) \pmod{7607} =$ -continued $$= (2022, 3525, 3394, 2238, 3238, 2198, 759, 5556),$$

which, after applying $Proj_2$ yields $$\begin{pmatrix} 1 & 0 \\ 0 & 1 \\ 1 & 0 \\ 1 & 0 \\ 1 & 0 \\ 1 & 0 \\ 1 & 1 \\ 0 & 0 \end{pmatrix}.$$

Repeating this calculation for $s(5)=4333$ we obtain $$(s(5)^{21}, s(5)^{22}, s(5)^{23}, \ldots, s(5)^{28}) \pmod{7247} =$$

$$= (5159, 4297, 6100, 3902, 6904, 1697, 2750, 3879),$$

which, after applying $Proj_2$ yields $$\begin{pmatrix} 1 & 1 \\ 0 & 1 \\ 0 & 0 \\ 1 & 0 \\ 0 & 0 \\ 0 & 1 \\ 1 & 0 \\ 1 & 1 \end{pmatrix}.$$

Repeating this calculation for $s(6)=5893$ we obtain $$(s(6)^{21}, s(6)^{22}, s(6)^{23}, \ldots, s(6)^{28}) \pmod{7559} =$$

$$= (1403, 3069, 247, 537, 1127, 217, 1735, 1743),$$

which, after applying $Proj_2$ yields $$\begin{pmatrix} 1 & 1 \\ 0 & 1 \\ 1 & 1 \\ 0 & 1 \\ 1 & 1 \\ 0 & 1 \\ 1 & 1 \\ 1 & 1 \end{pmatrix}.$$

Repeating this calculation for $s(7)=1404$ we obtain $$(s(7)^{21}, s(7)^{22}, s(7)^{23}, \ldots, s(7)^{28}) \pmod{7559} =$$

$$= (5876, 5423, 4419, 2664, 6554, 4678, 379, 20),$$

which, after applying $Proj_2$ yields $$\begin{pmatrix} 0 & 0 \\ 1 & 1 \\ 1 & 1 \\ 0 & 0 \\ 1 & 0 \\ 1 & 0 \\ 1 & 1 \\ 0 & 0 \end{pmatrix}.$$

Repeating this calculation for $s(8)=33$ we obtain $$(s(8)^{21}, s(8)^{22}, s(8)^{23}, \ldots, s(8)^{28}) \pmod{7247} =$$

$$= (1089, 4660, 3588, 3072, 1590, 6144, 6360, 4093).$$

which, after applying $Proj_2$ yields $$\begin{pmatrix} 0 & 1 \\ 0 & 0 \\ 0 & 0 \\ 0 & 0 \\ 1 & 0 \\ 0 & 0 \\ 0 & 0 \\ 0 & 1 \end{pmatrix}.$$

Finally, the 8 columns can be put together to form an 8 by 8 array of 2-bit numbers:

$$(*) \begin{pmatrix} 00 & 00 & 00 & 10 & 11 & 11 & 00 & 01 \\ 10 & 00 & 00 & 01 & 01 & 01 & 11 & 00 \\ 10 & 10 & 00 & 10 & 00 & 11 & 11 & 00 \\ 10 & 00 & 01 & 10 & 10 & 01 & 00 & 00 \\ 11 & 01 & 00 & 10 & 00 & 11 & 10 & 10 \\ 00 & 00 & 10 & 10 & 01 & 01 & 10 & 00 \\ 00 & 10 & 10 & 11 & 10 & 11 & 11 & 00 \\ 01 & 01 & 00 & 00 & 11 & 11 & 00 & 01 \end{pmatrix}.$$

Figure 4:
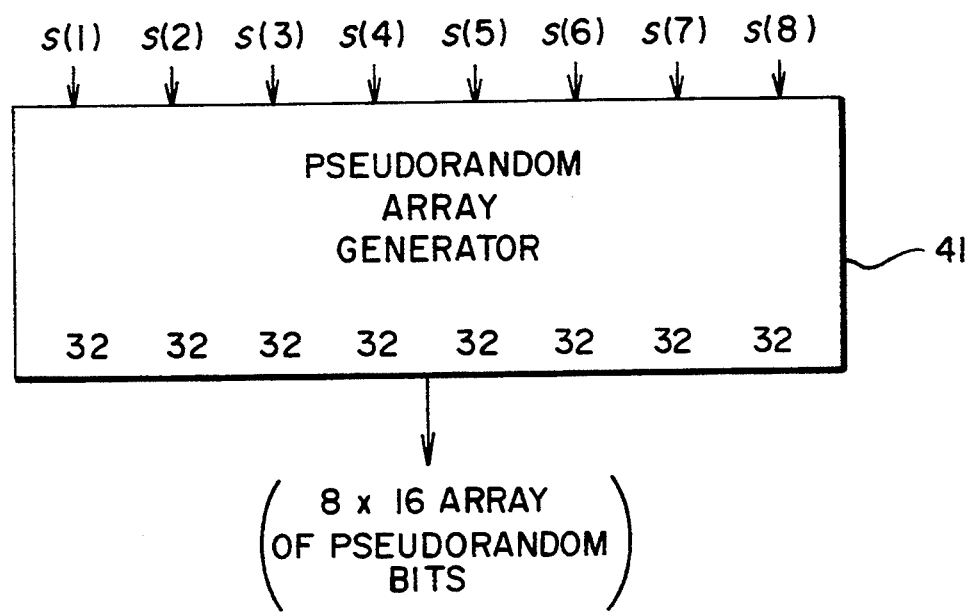
FIG. 4 is a block diagram of the Pseudorandom Array Generator.
Figure 5:
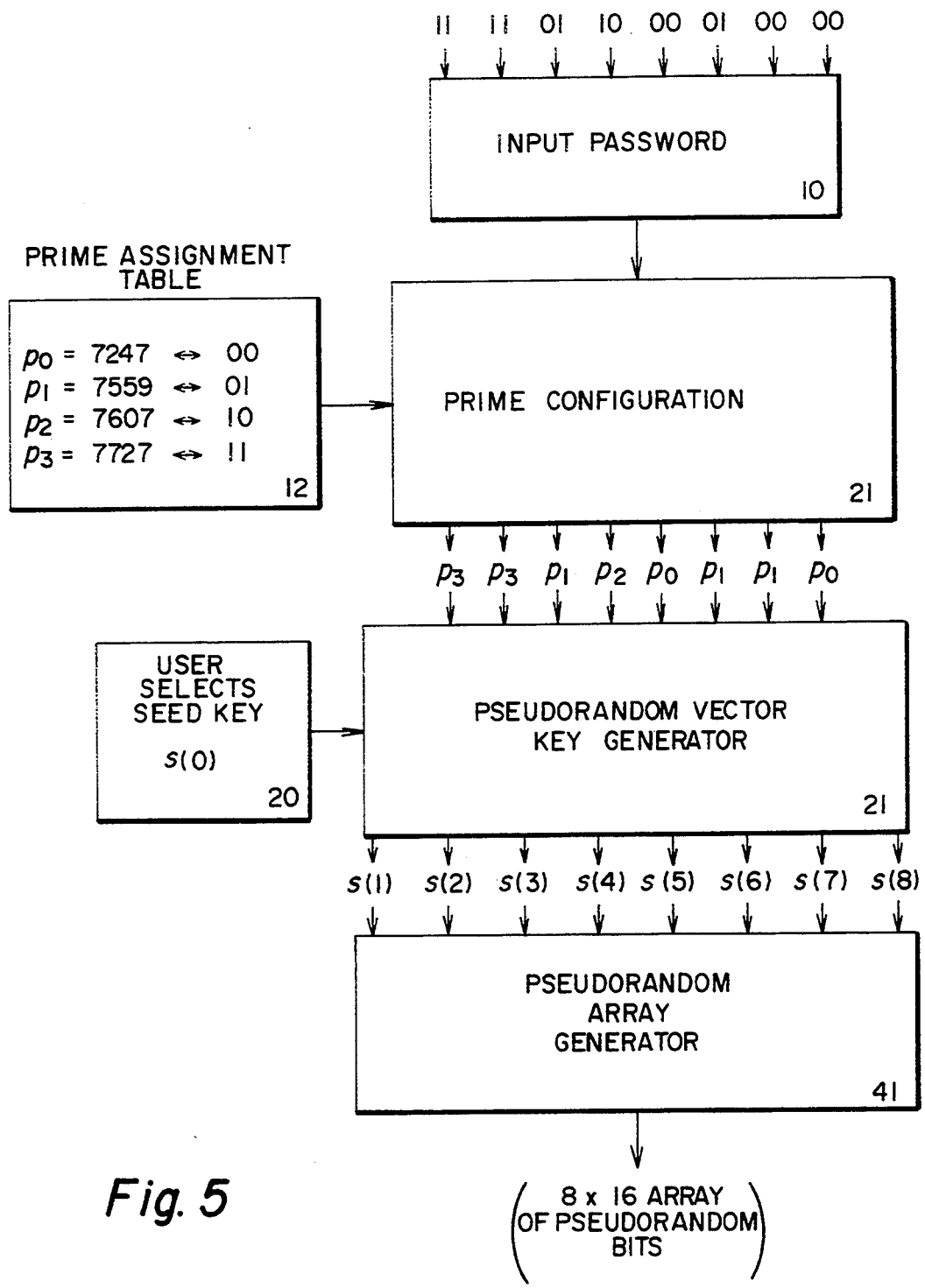
FIG. 5 is a block diagram of the programmable multistream encryption system according to the present invention.

A plurality of column generators 32 can be combined using parallel computing structures to obtain a pseudorandom array generator 41, shown in FIG. 4. This completes the description of the pseudorandom array generator PRAG for this particular example of MUSE. The schematic for PRAG is illustrated in FIG. 5.

Finally, we complete the description of MUSE for this example. There will be 2 buffers. Each buffer will consist of an 8 by 16 array. At each discrete time instance (state), PRAG will fill the first array with pseudorandomly chosen zeroes and ones while the other buffer will fill with incoming data. The bits in each array are added componentwise (mod 2) yielding the encrypted data which is then shipped. The buffers are erased and ready for the next state. For example, if the incoming data is a large X, and the output of PRAG is the array (*) previously computed, then the buffers will be filled as follows:

$$\begin{pmatrix} 00 & 00 & 00 & 10 & 11 & 11 & 00 & 01 \\ 10 & 00 & 00 & 01 & 01 & 01 & 11 & 00 \\ 10 & 10 & 00 & 10 & 00 & 11 & 11 & 00 \\ 10 & 00 & 01 & 10 & 10 & 01 & 00 & 00 \\ \\ 11 & 01 & 00 & 10 & 00 & 11 & 10 & 10 \\ 00 & 00 & 10 & 10 & 01 & 01 & 10 & 00 \\ 00 & 10 & 10 & 11 & 10 & 11 & 11 & 00 \\ 01 & 01 & 00 & 00 & 11 & 11 & 00 & 01 \end{pmatrix} \begin{pmatrix} 11 & 00 & 00 & 00 & 00 & 00 & 00 & 11 \\ 00 & 11 & 00 & 00 & 00 & 00 & 11 & 00 \\ 00 & 00 & 11 & 00 & 00 & 11 & 00 & 00 \\ 00 & 00 & 01 & 11 & 11 & 00 & 00 & 00 \\ \\ 00 & 00 & 00 & 11 & 11 & 00 & 00 & 00 \\ 00 & 00 & 11 & 00 & 00 & 11 & 00 & 00 \\ 00 & 11 & 00 & 00 & 00 & 00 & 11 & 00 \\ 11 & 00 & 00 & 00 & 00 & 00 & 00 & 11 \end{pmatrix}$$

PRAG output         Incoming Data

After componentwise addition (mod 2), the configuration changes to:

$$\begin{pmatrix} 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \end{pmatrix} \begin{pmatrix} 11 & 00 & 00 & 10 & 11 & 11 & 00 & 10 \\ 10 & 11 & 00 & 01 & 01 & 01 & 00 & 00 \\ 10 & 10 & 11 & 10 & 00 & 00 & 11 & 00 \\ 10 & 00 & 00 & 01 & 01 & 01 & 00 & 00 \\ \\ 11 & 01 & 00 & 01 & 11 & 11 & 10 & 10 \\ 00 & 00 & 01 & 10 & 01 & 10 & 10 & 00 \\ 00 & 01 & 10 & 11 & 10 & 11 & 00 & 00 \\ 10 & 01 & 00 & 00 & 11 & 11 & 00 & 10 \end{pmatrix}$$

where the right hand buffer contains the encrypted data and the left hand buffer is cleared. The encrypted data is now shipped and the buffers are completely erased and ready for the next state $$\begin{pmatrix} 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \end{pmatrix} \begin{pmatrix} 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \end{pmatrix}$$

Since addition is performed (mod 2) it is easily seen that if encryption is performed twice in succession then we will obtain our original data back. Hence, the processes of encryption and decryption are the same.

Example 2 (with 4 primes of bit length 16) was implemented in C programming language and run on a 50 MHZ personal computer. To increase computational speed, table look-up was used with regard to squaring modulo each of the four primes. The program was tested on a 1 Megabit input data file which was set as a 1000 by 1000 two dimensional array. The program spends more than 99% of its time in a tight loop executing the Pseudorandom Column Generator (see FIG. 4).

This loop has the following Intel 486 instructions: 4 MOVE(1) instructions, 6 Shift(6)instructions, 1 ADD(-1)instruction, one AND(1)instruction, one ADD(1) instruction and 3 OR(3) instructions. The number of clock cycles needed to execute an instruction are given in parenthesis. The result code can be further optimized in assembly language.

The sum of the clock cycles for this loop is approximately 50. It takes 1 microsecond to execute this loop on a 50 MHZ (50,000,000 clock cycles per second) computer. The projection operator is of length 2, therefore, the approximate time needed to encode a 1 Megabit input file is 500,000 microseconds or 0.5 seconds.

The latter, of course, does not include the operating system overhead.

To give a concrete example, a low resolution page of fax (which is a 1 Megabit uncompressed file) will be encrypted in about half of a second. A high resolution page of fax (200×200 dots per square inch=4 Megabit file) will be encrypted in approximately 2 seconds which is negligible compared to fax transmission. If encryption is performed after file compression, then the file will shrink by a factor of 20 and encryption will be of the order of 1/10 of one second. If encryption is performed on an ASCII text file where each symbol is represented by 8 bits, then encryption of 1,000,000 text symbols (one megabyte file) will require approximately 4 seconds.

We claim:

1. An apparatus for encrypting blocks of data comprising:
    a first finite state machine responsive to a seed key to generate a plurality of keys from said seed key:
    a second finite state machine responsive to said plurality of keys to generate a pseudorandom encryption array, wherein said first and second finite state machines exhibit a varying output in both time and space.

2. An apparatus according to claim 1, further comprising means for combining said pseudorandom encryption array with a data array.

3. An apparatus according to claim 2, wherein said means for combining is a means for encrypting information in said data buffer.

4. An apparatus according to claim 3, wherein said means for combining is a means for decrypting information in said data buffer.

5. An apparatus for encrypting blocks of data comprising:
    a key vector generator having a seed key input and at least one next-state output and generating a time varying key;
    a pseudorandom ring based array generator connected to said key vector generator;
    an encryption array buffer connected to said pseudorandom array generator;
    a data buffer;
    means for combining information contained in said encryption array buffer with information contained in said data buffer.

6. An apparatus according to claim 5, wherein said key vector generator and said array generator are configured to generate multiple independent pseudorandom sequences using the same quantity of non-linear operations as required to produce one independent pseudorandom sequence.

7. An apparatus according to claim 5, further comprising a statistical monitor connected to said data buffer for detecting unauthorized decryption attempts.

8. An apparatus according to claim 5, wherein said pseudorandom array generator comprises a plurality of parallel processors.

9. An apparatus according to claim 5 wherein said pseudorandom array generator is an iterative real time array generator.

10. A method for encrypting blocks of data comprising the steps of:
    generating a plurality of pseudorandom keys from a seed key;

generating one or more pseudorandom arrays varying in both time and space from each pseudorandom key;

storing said arrays in an encryption buffer;

combining data with information in said encryption buffer.

11. A method according to claim 10, further comprising the step of: storing information in a data buffer.

12. A method according to claim 11, wherein the step of combining is an addition and operates to encrypt or decrypt data.

13. A method according to claim 11, further comprising the step of storing said arrays into a plurality of buffers and storing a plurality of data streams into a plurality of corresponding data buffers.

* * * * *